(12) United States Patent
Kim et al.

(10) Patent No.: US 10,299,631 B2
(45) Date of Patent: May 28, 2019

(54) JUICE SQUEEZING MODULE FOR JUICER

(71) Applicant: Jae Won Kim, Gimhae-si (KR)

(72) Inventors: Jae Won Kim, Gimhae-si (KR); Young Ki Kim, Gimhae-si (KR)

(73) Assignee: Jae Won Kim, Gimhae-si (KR)

( * ) Notice: Subject to any disclaimer, the term of this patent is extended or adjusted under 35 U.S.C. 154(b) by 220 days.

(21) Appl. No.: 15/318,352

(22) PCT Filed: Jun. 4, 2015

(86) PCT No.: PCT/KR2015/005605
§ 371 (c)(1),
(2) Date: Dec. 12, 2016

(87) PCT Pub. No.: WO2015/190745
PCT Pub. Date: Dec. 17, 2015

(65) Prior Publication Data
US 2017/0119214 A1  May 4, 2017

(30) Foreign Application Priority Data
Jun. 13, 2014 (KR) .................. 10-2014-0072232

(51) Int. Cl.
*A47J 19/00* (2006.01)
*A47J 19/02* (2006.01)
(Continued)

(52) U.S. Cl.
CPC ........... *A47J 43/0716* (2013.01); *A47J 19/02* (2013.01); *A47J 19/025* (2013.01); *A47J 19/06* (2013.01)

(58) Field of Classification Search
CPC .......... A47J 19/00; A47J 19/02–19/027; A47J 43/0465
See application file for complete search history.

(56) References Cited

U.S. PATENT DOCUMENTS

| 2009/0049998 A1* | 2/2009 | Kim ........................ A47J 19/06 |
| | | 99/510 |
| 2012/0055351 A1* | 3/2012 | Wo .......................... A47J 19/02 |
| | | 99/509 |

(Continued)

FOREIGN PATENT DOCUMENTS

| CN | 203378925 U | 1/2014 |
| KR | 10-0755440 | 9/2007 |

(Continued)

OTHER PUBLICATIONS

English translation of WO 2012091235 to Jin, published May 7, 2012.*
International Search Report for PCT/KR2015/005605.

*Primary Examiner* — Michael A Laflame, Jr.
(74) *Attorney, Agent, or Firm* — Morgan, Lewis & Bockius LLP

(57) ABSTRACT

The technology relates to a juice squeezing module for a juicer including: a juice squeezing drum mounted on a body of the juicer in such a manner as to be open on the top surface thereof and an engagement gear disposed on the edge of the periphery of the bottom surface thereof; a cap adapted to cover the top surface of the juice squeezing drum; a juice squeezing screw rotatably mounted at the inside of the juice squeezing drum; a screen drum mounted at the inside of the juice squeezing drum; a rotating brush adapted to brush the juice squeezing drum and the screen drum and having a brush ring gear connected to the engagement gear; and brush rotating means disposed on the underside of the juice squeezing drum to transmit the driving force of a driving shaft of the body to the engagement gear to rotate the rotating brush.

13 Claims, 8 Drawing Sheets

(51) Int. Cl.
*A47J 43/07* (2006.01)
*A47J 19/06* (2006.01)

(56) References Cited

U.S. PATENT DOCUMENTS

2013/0074708 A1    3/2013  Asbury et al.
2013/0081547 A1*   4/2013  Hu ...................... A47J 19/025
                                                                99/495

FOREIGN PATENT DOCUMENTS

| KR | 10-1038074 B1 | 6/2011 |
| KR | 10-2011-0138108 | 12/2011 |
| KR | 10-1134728 B1 | 4/2012 |
| KR | 10-2013-0098700 | 9/2013 |
| KR | 10-2013-0098701 A | 9/2013 |

\* cited by examiner

JUICE SQUEEZING MODULE FOR JUICER

BACKGROUND OF THE INVENTION

Field of the Invention

The present invention relates to a juice squeezing module for a juicer, and more particularly, to a juice squeezing module for a juicer that improves the structure in brush rotating means for driving a rotating brush adapted to continuously brush the inner peripheral surface of a juice squeezing drum and the outer peripheral surface of a screen drum.

Background of the Related Art

With the high interest in wellbeing and organic products, generally, many peoples drink the juice extracted from vegetables and fruits in their houses. Accordingly, many studies and developments on juicers used in houses have been continuously made.

As shown in FIGS. 1 and 2, an example of such juicers is disclosed in Korean Patent No. 0755440 wherein the juicer includes: a cap 110 having an injection hole 111 and a rotary shaft hole 112 formed at the center of the interior thereof; a juice squeezing drum 120 disposed on the underside of the cap 110 and having a screen drum guide projection 121 formed on the underside periphery thereof, a remnant discharging hole 122 and a juice discharging hole 123 extended outward from the lower end periphery thereof, a waterproofing cylinder 124 having a through hole 124a formed at the lower end portion of the center thereof, a pressure discharging passage 125 formed along the lower end periphery of the waterproofing cylinder 124, a first opening 126 formed on the screen drum guide projection 121 in such a manner as to communicate with the pressure discharging passage 125, and an engagement gear 127 rotatably disposed on the first opening 126; a juice squeezing screw 130 having an upper rotary shaft 131 formed on the top portion thereof in such a manner as to be rotatably inserted into the rotary shaft hole 112, a plurality of screw spiral lines 132 formed on the outer peripheral surface thereof, a screw ring gear 133 protruding from the lower end periphery thereof in such a manner as to be inserted into the pressure discharging passage 125 and engaged with the engagement gear 127, a lower space 135 formed at the inside of the screw ring gear 133 in such a manner as to insert the waterproofing cylinder 121 thereinto, and a lower rotary shaft 134 having a polygonal shaft hole 134a formed at the center of the lower portion thereof; a screen drum 140 disposed inside the juice squeezing drum 120 and having a screen structure 141 as an external wall thereof and a plurality of wall blades 142 formed on the inner peripheral surface thereof; a rotating brush 150 rotatably mounted between the juice squeezing drum 120 and the screen drum 140 and having brush members 151a and 151b adapted to continuously brush the juice squeezing drum 120 and the screen drum 140 and a brush ring gear 152 mounted on the underside thereof in such a manner as to be engaged with the engagement gear 127; and a driving body 160 having a driving motor (not shown) mounted at the inside thereof and a polygonal shaft 161 of the driving motor inserted into the polygonal shaft hole 134a of the juice squeezing screw 130 through the through hole 124a of the waterproofing cylinder 124 to rotate the juice squeezing screw 130.

In this case, the engagement gear 127 is engaged with the screw ring gear 133 at the inside of the screen drum guide protrusion 121 and at the same time engaged with the brush ring gear 152 at the outside of the screen drum guide protrusion 121. Accordingly, the juice squeezing screw 130, which receives the power from the polygonal shaft 161 of the driving body 160, transmits the received power to the engagement gear 127 through the screw ring gear 133. At this time, as shown in FIG. 2, if the juice squeezing screw 130 rotates in a clockwise direction, the engagement gear 127 rotates in a counterclockwise direction. Next, the rotating brush 150 engaged with the engagement gear 127 by means of the brush ring gear 152 rotates in the counterclockwise direction according to the rotation of the engagement gear 127 in the counterclockwise direction, thus continuously brushing the inner peripheral surface of the juice squeezing drum 120 and the outer peripheral surface of the screen drum 140 through the brush members 151a and 151b.

In case of the conventional juicer, however, remnants may be undesirably mixed with the juice discharged to the outside of the screen drum 140, through the first opening 126 in which the engagement gear 127 is rotatably disposed.

Further, since the engagement gear 127, which is engaged with the screw ring gear 133 and the brush ring gear 152, is structurally disposed on the bottom surface of the juice squeezing drum 120 in such a manner as to be connected to the underside of the juice squeezing screw 130, the freedom of design on the interior of the juice squeezing drum 120 may be decreased.

SUMMARY OF THE INVENTION

Accordingly, the present invention has been made in view of the above-mentioned problems occurring in the prior art, and it is an object of the present invention to provide a juice squeezing module for a juicer wherein an engagement gear for engagedly rotating a rotating brush is not disposed on the area of the bottom surface of a juice squeezing drum wherein a juice squeezing screw is mounted, thus preventing remnants from being introduced into juice and further improving the freedom of design on the bottom surface of the juice squeezing drum.

To accomplish the above object, according to a first aspect of the present invention, there is provided a juice squeezing module for a juicer adapted to be mounted on a body of the juicer with a driving shaft protruding upward therefrom to perform a juice squeezing operation, the juice squeezing module including: a juice squeezing drum mounted on the body of the juicer in such a manner as to be open on the top surface thereof and having a juice discharging hole and a remnant discharging hole formed on the lower end periphery thereof and an engagement gear disposed on the edge of the periphery of the bottom surface thereof; a cap adapted to cover the top surface of the juice squeezing drum and having an injection hole formed on the top side thereof; a juice squeezing screw rotatably mounted at the inside of the juice squeezing drum and having screw spiral lines formed on the outer peripheral surface thereof and a power connector disposed on the underside thereof in such a manner as to be connected to the driving shaft; a screen drum mounted at the inside of the juice squeezing drum and having a screen structure as the outer peripheral wall thereof; a rotating brush disposed between the juice squeezing drum and the screen drum in such a manner as to rotate and brush the inner peripheral surface of the juice squeezing drum and the outer peripheral surface of the screen drum and having a brush ring gear mounted on the underside periphery thereof in such a manner as to be connected to the engagement gear; and brush rotating means disposed on the underside of the juice squeezing drum to transmit the driving force of the driving shaft of the body of the juicer to the engagement gear to rotate the rotating brush.

According to the present invention, desirably, the brush rotating means is formed of a gear module connecting the driving shaft and the engagement gear.

According to the present invention, desirably, the brush rotating means includes: a first shaft gear interposed between the driving shaft and the power connector of the juice squeezing screw in such a manner as to rotate unitarily with the juice squeezing screw and having a first gear formed on the outer peripheral surface thereof; and a second shaft gear coupled to the center shaft of the engagement gear on the top end periphery thereof and having a second gear formed on the outer peripheral surface of the lower portion thereof in such a manner as to be connected to the first gear.

According to the present invention, desirably, the brush rotating means further includes a gear interposed between the first gear of the first shaft gear and the second gear of the second shaft gear.

According to the present invention, desirably, the juice squeezing module further includes a brush rotating means cover coupled to the underside of the juice squeezing drum to cover and support the lower portion of the brush rotating means.

To accomplish the above object, according to a second aspect of the present invention, there is provided a juice squeezing module for a juicer adapted to be mounted on a body of the juicer with a driving shaft protruding downward therefrom to perform a juice squeezing operation, the juice squeezing module including: a juice squeezing drum mounted on the body of the juicer in such a manner as to be open on the top surface thereof and having a juice discharging hole and a remnant discharging hole formed on the lower end periphery thereof and an engagement gear disposed on the edge of the periphery of the bottom surface thereof; a cap adapted to cover the top surface of the juice squeezing drum and having an injection hole formed on the top side thereof and a driving shaft through hole formed at the center thereof, through which the top end periphery of the driving shaft is rotatably passed; a juice squeezing screw rotatably mounted at the inside of the juice squeezing drum and having screw spiral lines formed on the outer peripheral surface thereof and a power connector disposed on the top thereof in such a manner as to be connected to the driving shaft; a screen drum mounted at the inside of the juice squeezing drum and having a screen structure as the outer peripheral wall thereof; a rotating brush disposed between the juice squeezing drum and the screen drum in such a manner as to rotate and brush the inner peripheral surface of the juice squeezing drum and the outer peripheral surface of the screen drum and having a brush ring gear mounted on the underside periphery thereof in such a manner as to be connected to the engagement gear; and brush rotating means disposed on the underside of the juice squeezing drum to transmit the rotary driving force of the juice squeezing drum to the engagement gear to rotate the rotating brush.

According to the present invention, desirably, the brush rotating means is formed of a gear module connecting the juice squeezing screw and the engagement gear.

According to the present invention, desirably, the brush rotating means includes: a first shaft gear coupled to the lower end periphery of the shaft of the juice squeezing screw in such a manner as to be rotated unitarily with the juice squeezing screw and having a first gear formed on the outer peripheral surface thereof; and a second shaft gear coupled to the center shaft of the engagement gear on the top end periphery thereof and having a second gear formed on the outer peripheral surface of the lower portion thereof in such a manner as to be connected to the first gear.

According to the present invention, desirably, the brush rotating means further includes a gear interposed between the first gear of the first shaft gear and the second gear of the second shaft gear.

According to the present invention, desirably, the juice squeezing module further includes a brush rotating means cover coupled to the underside of the juice squeezing drum to cover and support the lower portion of the brush rotating means.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, an explanation on a juice squeezing module for a juicer according to the present invention will be in detail given with reference to the attached drawing.

Further, the terms as will be discussed later are defined in accordance with the functions of the present invention, but may be varied under the intention or regulation of a user or operator. Therefore, they should be defined on the basis of the whole scope of the present invention. Therefore, they should be defined on the basis of the whole scope of the present invention. While the present invention will be described with reference to the particular illustrative embodiments, it is not to be restricted by the embodiments. It is to be appreciated that those skilled in the art can change or modify the embodiments without departing from the scope and spirit of the present invention.

Figure 1:
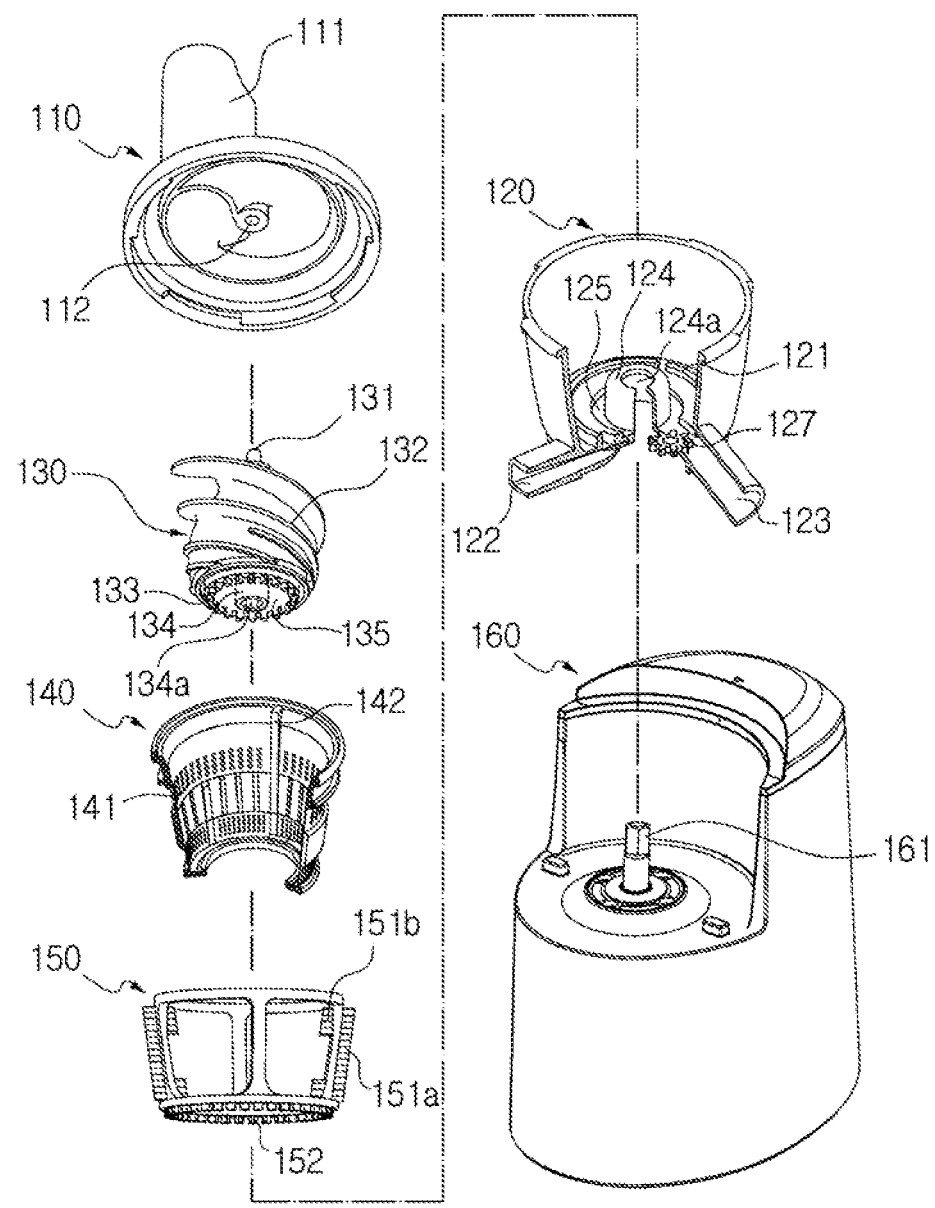
FIG. 1 is an exploded perspective view showing a conventional juicer having a rotating brush.
Figure 2:
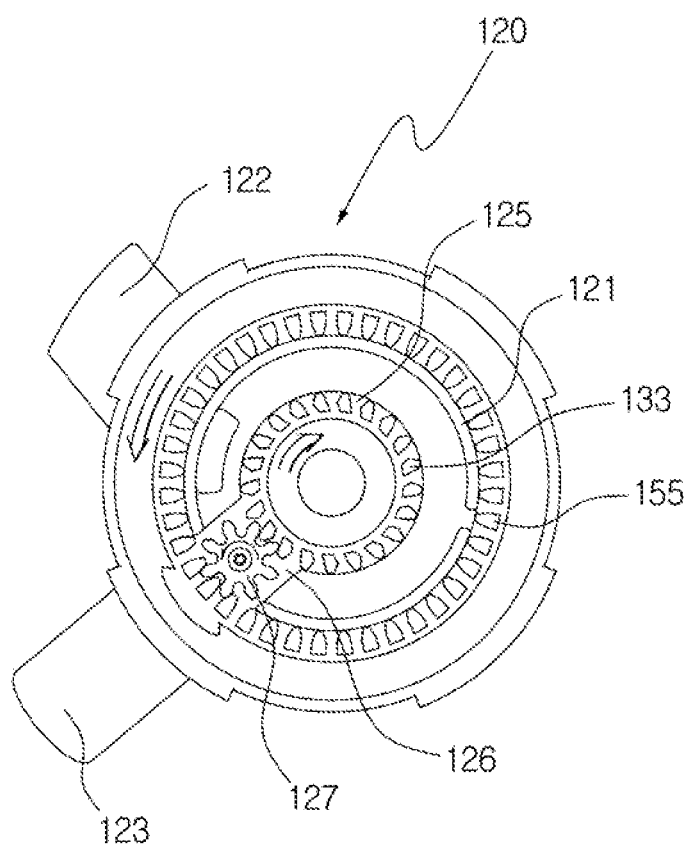
FIG. 2 is a top view showing the rotary operation of the rotating brush of FIG. 1.
Figure 3:
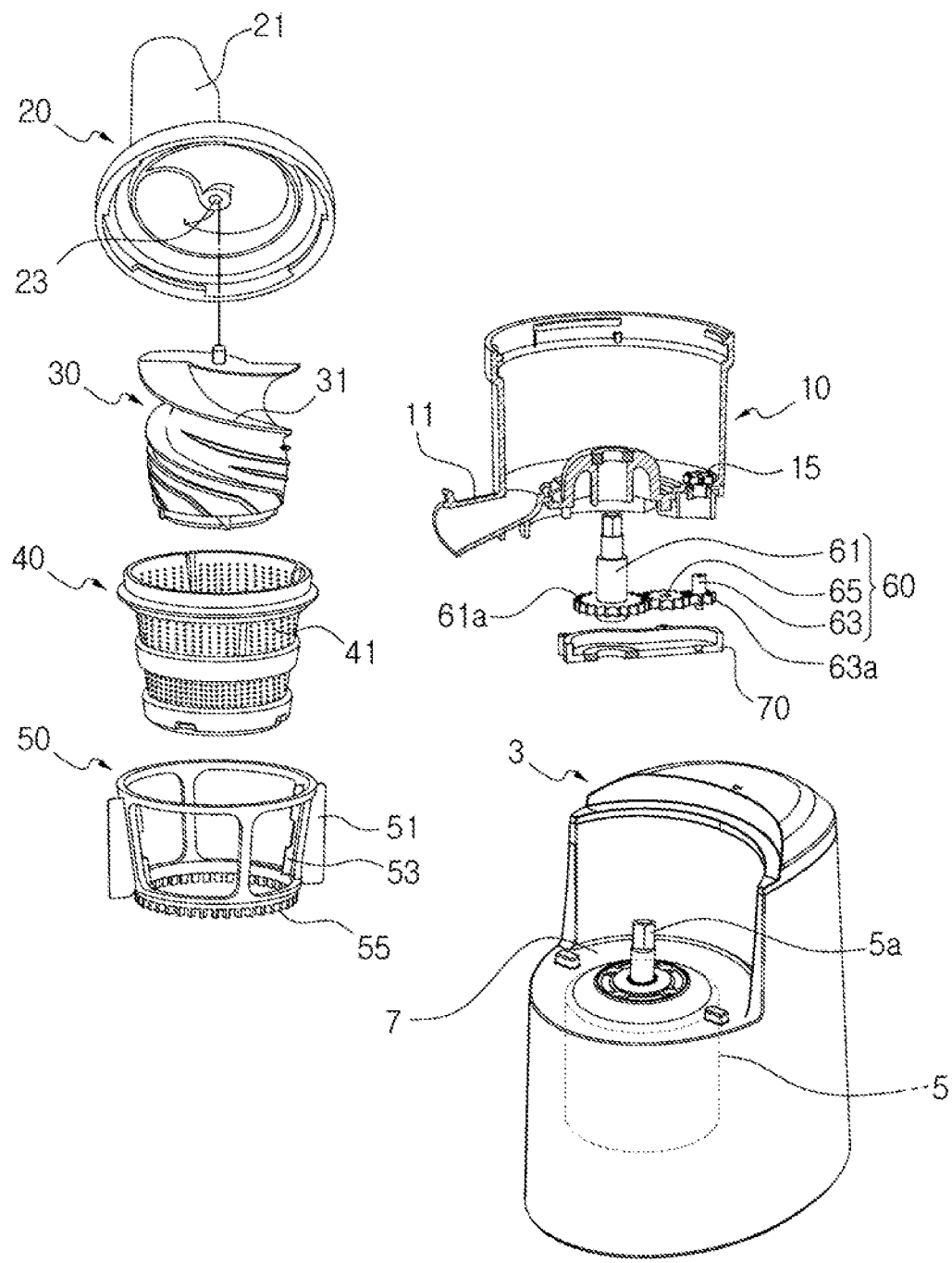
FIG. 3 is an exploded perspective view showing a juice squeezing module for a juicer according to a first embodiment of the present invention.
Figure 4:
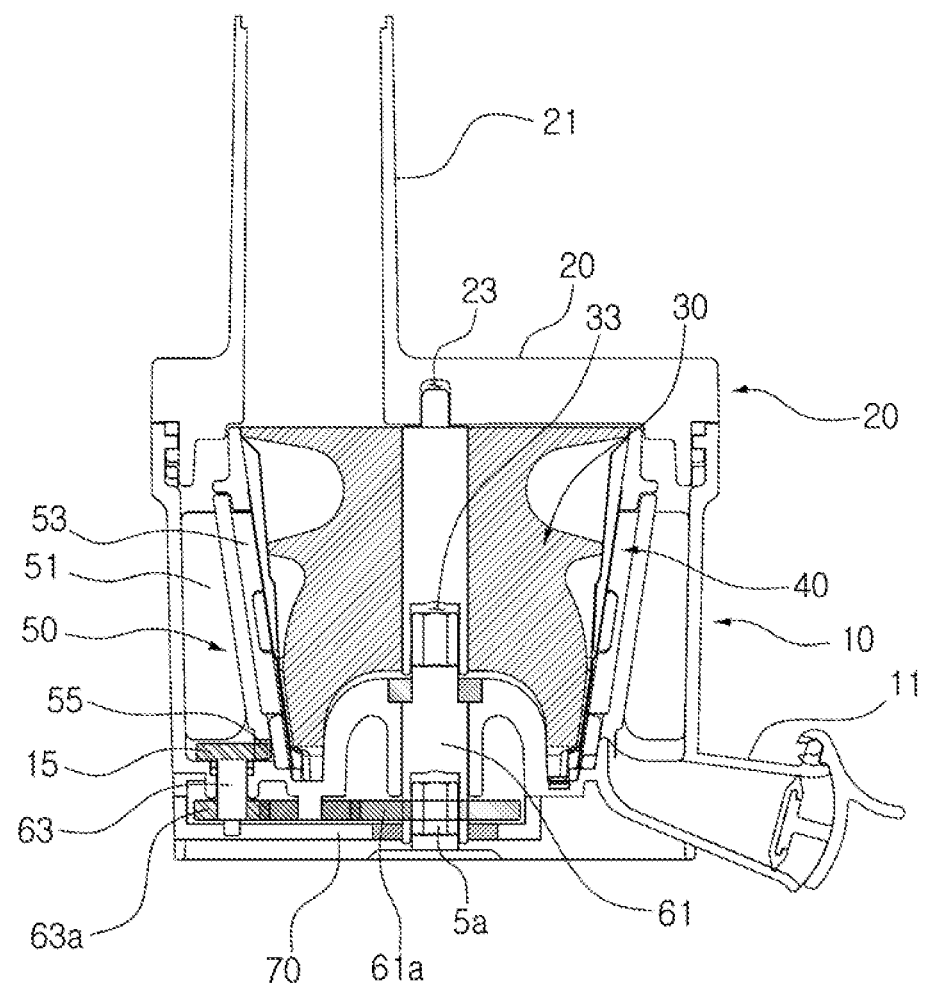
FIG. 4 is a sectional view showing the juice squeezing module for a juicer according to the first embodiment of the present invention.

As shown in FIGS. 3 and 4, a juice squeezing module for a juicer according to a first embodiment of the present invention is mounted on a body 3 of the lower powered type juicer having a driving shaft 5a and serves to perform a juice squeezing operation.

In this case, the body 3 of the juicer serves to generate a rotary driving force of a juice squeezing screw 30 and has a general driving motor 5 mounted at the inside thereof and a juice squeezing drum seating portion 7 formed on the upper side thereof to detachably mount a juice squeezing drum 10 thereon. The driving motor 5 has the driving shaft 5a protruding upward therefrom to transmit the driving force generated therefrom to the juice squeezing screw 30.

The driving motor 5 is a part for providing the driving force by which the juice squeezing screw 30 rotates at a low speed and has the driving shaft 5a protruding upward therefrom. The driving motor 5 can be freely selected in accordance with the shapes or use purposes of the juicer.

The juice squeezing drum seating portion 7 serves to supportedly mount the juice squeezing drum 10 on the body 3 of the juicer and is formed on the upper side of the body 3 to a shape corresponding to the underside of the juice squeezing drum 10. The juice squeezing drum seating part 7 stably supports the juice squeezing drum 10 in the state of being spaced apart from the ground by a given distance.

Figure 5:
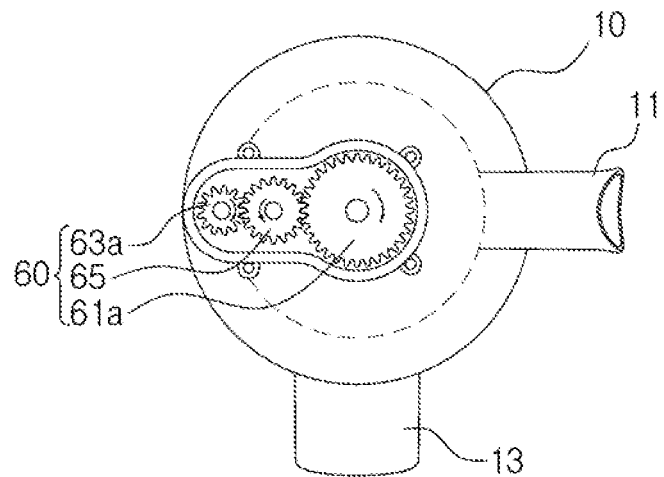
FIG. 5 is a top view showing the rotary operation of a rotating brush by means of brush rotating means in the juice squeezing module for a juicer according to the first embodiment of the present invention.
Figure 5:
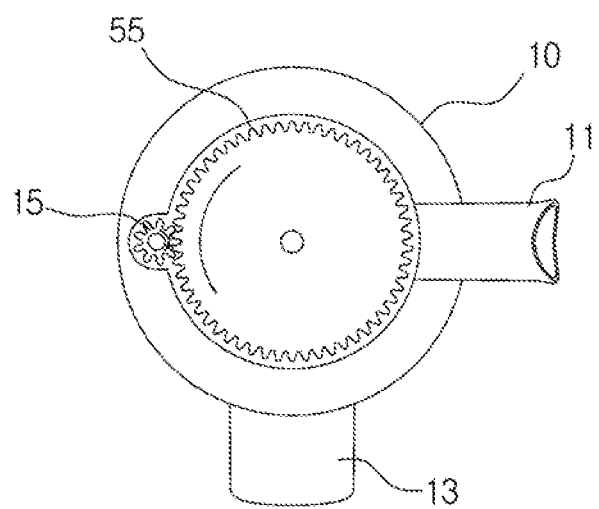

As shown in FIGS. 3 to 5, the juice squeezing module for the juicer according to the first embodiment of the present invention, which is mounted on the body 3 of the juicer as mentioned above, includes the juice squeezing drum 10, a cap 20, the juice squeezing screw 30, a screen drum 40, a rotating brush 50, and brush rotating means 60.

The juice squeezing drum 10 serves to accommodate the juice squeezing screw 30, the screen drum 40 and the rotating brush 50 thereinto and is open on the top surface thereof and mounted on the juice squeezing drum seating portion 7 of the body 3 of the juicer.

The juice squeezing drum 10 has a juice discharging hole 11 and a remnant discharging hole 13 (See FIG. 5) formed spaced apart from each other on the lower end periphery thereof, and according to the present invention, the juice discharging hole 11 and the remnant discharging hole 13 have a shape of a pipe having an open front surface, through which juice or remnants can be easily discharged.

The juice squeezing drum 10 has an engagement gear 15 disposed on the bottom surface at the inside thereof, and the engagement gear 15 receives the rotary driving force of the driving shaft 5a through the brush rotating means 60 to rotate the rotating brush 50.

The engagement gear 15 is disposed on the edge of the periphery of the bottom surface of the juice squeezing drum 10, not on the area of the bottom surface thereof wherein the juice squeezing screw 30 is mounted, so that the engagement gear 15 is brought into contact with the outer or inner periphery of a brush ring gear 55 of the rotating brush 50. Such formation of the engagement gear 15 improves the space utilization and the freedom of design for the bottom surface of the juice squeezing drum 10, especially, for the bottom surface of the juice squeezing drum 10 located under the juice squeezing screw 30, thus making the lower portion of the juice squeezing drum 10 freely designed with no restriction.

The cap 20 is detachably coupled to the top surface of the juice squeezing drum 10 and has an underside shape corresponding to the top surface of the juice squeezing drum 10 so as to cover the open top surface of the juice squeezing drum 10. The cap 20 is open on the underside thereof and has an injection hole 21 protruding upward from one side of the top surface thereof in such a manner as to be connected to the open underside surface thereof and open on the top surface thereof so as to allow extraction materials to be injected thereinto. Further, the cap 20 has a shaft coupling hole 23 formed at the center of the underside thereof, into which the top end periphery of the shaft of the juice squeezing screw 30 is rotatably inserted.

The juice squeezing screw 30 is rotatably mounted at the inside of the juice squeezing drum 10 and serves to rotate in the screen drum 40 to compress, squeeze or grind the injected materials between the juice squeezing screw 30 and the screen drum 40, thus producing the juice from the extraction materials. The juice squeezing screw 30 has a plurality of screw spiral lines 31 formed on the outer peripheral surface thereof so as to squeeze the injected extraction materials through the contact with the inner peripheral surface of the screen drum 40 and to compressedly move the squeezed materials toward the lower end side of the screen drum 40 and a power connector 33 disposed on the underside thereof so as to receive the driving force generated from the body 3 of the juicer.

Figure 6:
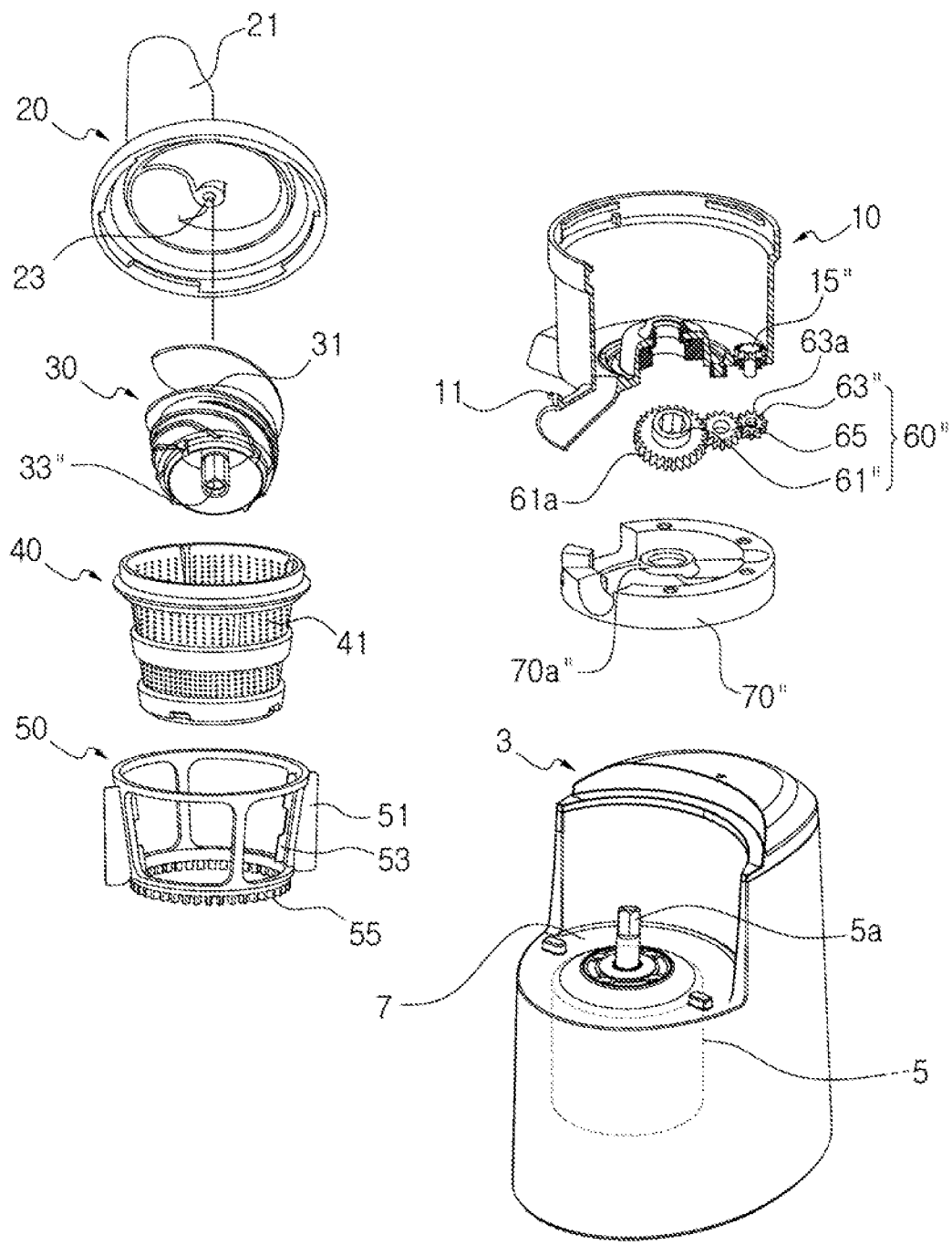
FIG. 6 is an exploded perspective view showing a juice squeezing module for a juicer according to a second embodiment of the present invention.
Figure 7:
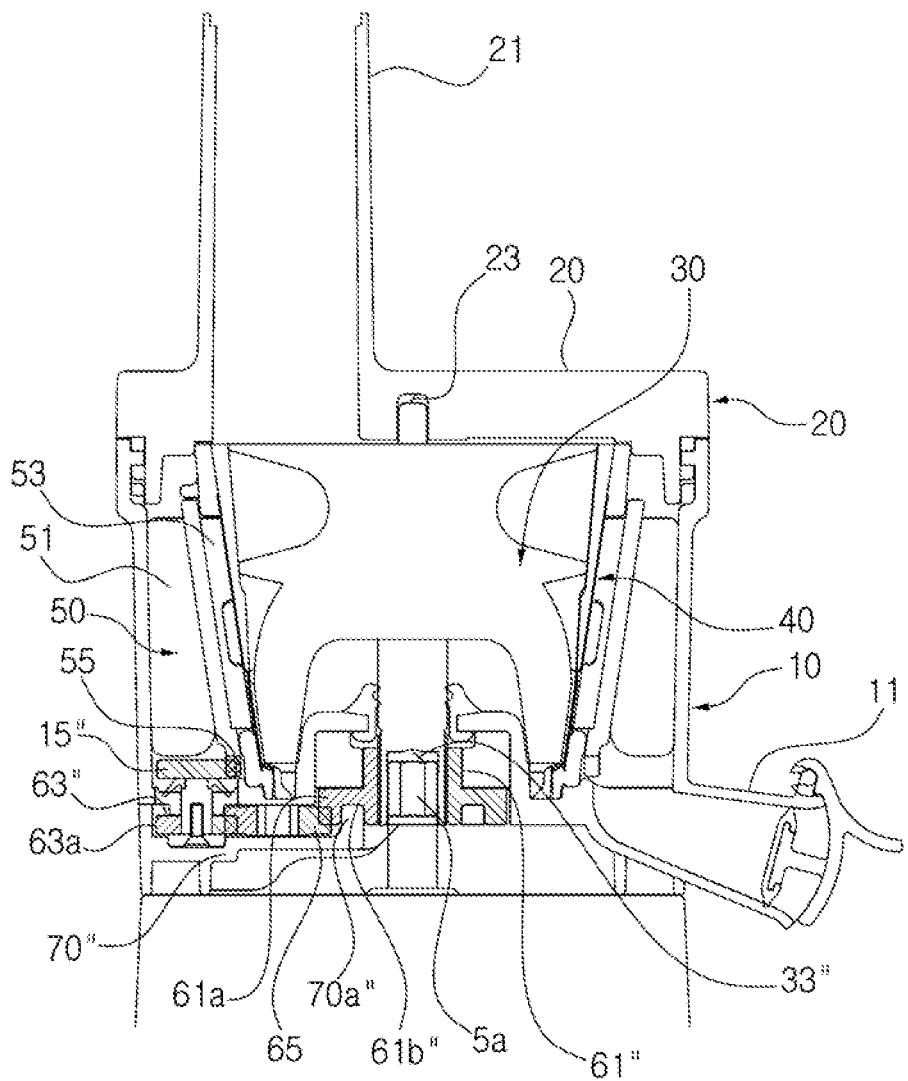
FIG. 7 is a sectional view showing the juice squeezing module for a juicer according to the second embodiment of the present invention.

The power connector 33 is disposed on the underside of the juice squeezing drum 30 to transmit the driving force generated from the driving motor 5 to the juice squeezing screw 30. The power connector 33 is desirably formed to a shape of a polygonal groove into which the top end periphery of a first shaft gear 61 of the brush rotating means 60 as will be discussed later is inserted. According to another embodiment of the present invention, as shown in FIGS. 6 and 7, a power connector 33" is formed to a shape of a polygonal groove into which the driving shaft 5a of the body 3 is inserted after passed through a first shaft gear 61" of the brush rotating means 60. However, only if the power connector 33 transmits the driving force generated from the driving motor 5 to the juice squeezing screw 30, it does not matter in shape.

Referring again to FIGS. 3 to 5, the screen drum 40 is mounted at the inside of the juice squeezing drum 10 and has a screen structure 41 as the outer peripheral wall thereof to allow the juice extracted through the compression and squeezing or grinding between the juice squeezing screw 30 and the screen drum 40 from the extraction materials injected into the juice squeezing drum 20 through the injection hole 21, as the juice squeezing screw 30 rotates, to be discharged to the outside thereof. Further, the screen drum 40 is open on the top and underside thereof in such a manner as to become reduced in diameter as it goes toward the lower portion thereof.

The juice extracted through the cooperative operation between the juice squeezing screw 30 and the screen drum 40 through the rotation of the juice squeezing screw 30 is discharged through the screen structure 41 of the screen drum 40, and the remnants of the extraction materials after the squeezing are discharged through the lower portion of the screen drum 40 to the remnant discharging hole 13.

The rotating brush 50 is disposed between the juice squeezing drum 10 and the screen drum 40 and serves to rotate between the juice squeezing drum 10 and the screen drum 40, while continuously brushing the inner peripheral surface of the juice squeezing drum 10 and the outer peripheral surface of the screen drum 40.

The rotating brush 50 includes first brush members 51 disposed radially on the outer peripheral surface thereof to continuously brush the inner peripheral surface of the juice squeezing drum 10 and second brush members 53 disposed radially on the inner peripheral surface thereof to continuously brush the outer peripheral surface of the screen drum 40. The first and second brush members 51 and 53 are desirably made of a soft silicone material not harmful to the human body so as to softly brush the inner peripheral surface of the juice squeezing drum 10 and the outer peripheral surface of the screen drum 40.

The rotating brush 50 further has the brush ring gear 55 mounted on the underside periphery thereof, and the brush ring gear 55 is connected externally or internally to the engagement gear 15 to allow the rotating brush 50 to rotate according to the rotation of the engagement gear 15.

The brush rotating means 60 is disposed on the underside of the juice squeezing drum 10 and serves to transmit the driving force of the driving shaft 5a of the body 3 of the juicer to rotate the juice squeezing screw 30 and the rotating brush 50.

As shown in FIGS. 3 to 5, the brush rotating means 60 is desirably formed of a gear module connecting the driving shaft 5a of the body 3 of the juicer and the engagement gear 15 of the juice squeezing drum 10, but may be replaced with various means connecting the driving shaft 5a of the body 3 of the juicer and the engagement gear 15 of the juice squeezing drum 10.

If the brush rotating means 60 is formed of the gear module connecting the driving shaft 5a of the body 3 of the juicer and the engagement gear 15 of the juice squeezing drum 10, the brush rotating means 60 includes the first shaft gear 61 interposed between the driving shaft 5a of the body 3 and the power connector 33 of the juice squeezing screw 30 in such a manner as to rotate unitarily with the juice squeezing screw 30 and having a first gear 61a formed on the outer peripheral surface thereof and a second shaft gear 63 coupled to the center shaft of the engagement gear 15 on the top end periphery thereof and having a second gear 63a formed on the outer peripheral surface of the lower portion thereof in such a manner as to be connected to the first gear 61a. Otherwise, as shown in FIGS. 6 and 7, brush rotating means 60" includes a first shaft gear 61" engaged with the outer peripheral surface of a power connector 33" of the juice squeezing screw 30 in such a manner as to rotate unitarily with the juice squeezing screw 30 and having the first gear 61a formed on the outer peripheral surface thereof and a second shaft gear 63" coupled to the center shaft of an engagement gear 15" and having the second gear 63a formed on the outer peripheral surface thereof in such a manner as to be connected to the first gear 61a. Accordingly, the structure of the brush rotating means may be freely varied.

Referring again to FIGS. 3 to 5, desirably, the brush rotating means 60 further includes a gear 65 interposed between the first gear 61a of the first shaft gear 61 and the second gear 63a of the second shaft gear 63.

Further, a brush rotating means cover 70 is coupled to the underside of the juice squeezing drum 10 on which the brush rotating means 60 is disposed. The brush rotating means cover 70 serves to support and cover the lower portion of the brush rotating means 60 and has a shape of a casing open on the top end thereof in such a manner as to be sealedly coupled to the underside of the juice squeezing drum 10 by means of a packing and fastening members (not shown). According to the second embodiment of the present invention, as shown in FIGS. 6 and 7, a brush rotating means cover 70" has a ring projection 70a" inserted into a ring groove 61b" formed on the underside of the first gear 61a so as to support the first shaft gear 61", thus supporting the brush rotating means 60" thereagainst.

Hereinafter, an operational relation wherein the rotating brush 50 is driven by the brush rotating means 60 in the juice squeezing module for the juicer according to the first embodiment of the present invention will be described with reference to FIG. 5.

In the state wherein the brush rotating means 60 having the first shaft gear 61, the second shaft gear 63 and the gear 65 is interposed between the driving shaft 5a of the body 3 of the juicer and the engagement gear 15 of the juice squeezing drum 10, as shown in FIG. 5, if the driving shaft 5a of the body 3 of the juicer rotates in a clockwise direction, the first shaft gear 61 having the first gear 61a rotates in the clockwise direction, together with the driving shaft 5a.

Accordingly, the gear 65 interposed between the first gear 61a and the second gear 63a rotates in a counterclockwise direction to rotate the second shaft gear 63 having the second gear 63a in the clockwise direction.

Accordingly, the engagement gear 15 fixedly coupled to the top end periphery of the second shaft gear 63 rotates in the clockwise direction, and finally, the rotating brush 50 rotates in the counterclockwise direction by means of the brush ring gear 55 engaged externally with the engagement gear 15. That is, the rotating brush 50 rotates in the opposite direction to the rotating direction of the juice squeezing screw 30 through the driving shaft 5a of the body 3 of the juicer. Even if not shown, it is obvious that if the driving shaft 5a of the body 3 of the juicer rotates in the counterclockwise direction, the rotating brush 50 rotates in the opposite direction to the rotating direction of the juice squeezing screw 30 through the driving shaft 5a of the body 3 of the juicer.

In case of the juice squeezing module for the juicer according to the first embodiment of the present invention, the engagement gear 15 for the engagement rotation with the rotating brush 50 is disposed on the edge of the periphery of the bottom surface of the juice squeezing drum 10, not on the area of the bottom surface thereof wherein the juice squeezing screw 30 is mounted, and at the same time, the brush rotating means 60, which transmits the driving force of the driving shaft 5a of the body 3 to the engagement gear 15 to engagedly rotate the rotating brush 50, is disposed on the underside of the juice squeezing drum 10, so that the introduction of remnants into the juice can be prevented and the freedom of design for the bottom surface of the juice squeezing drum 10 can be improved, thus making the lower portion of the juice squeezing drum 10 freely designed and allowing the remnants to be gently and uniformly discharged to achieve effective juice squeezing operation.

Figure 8:
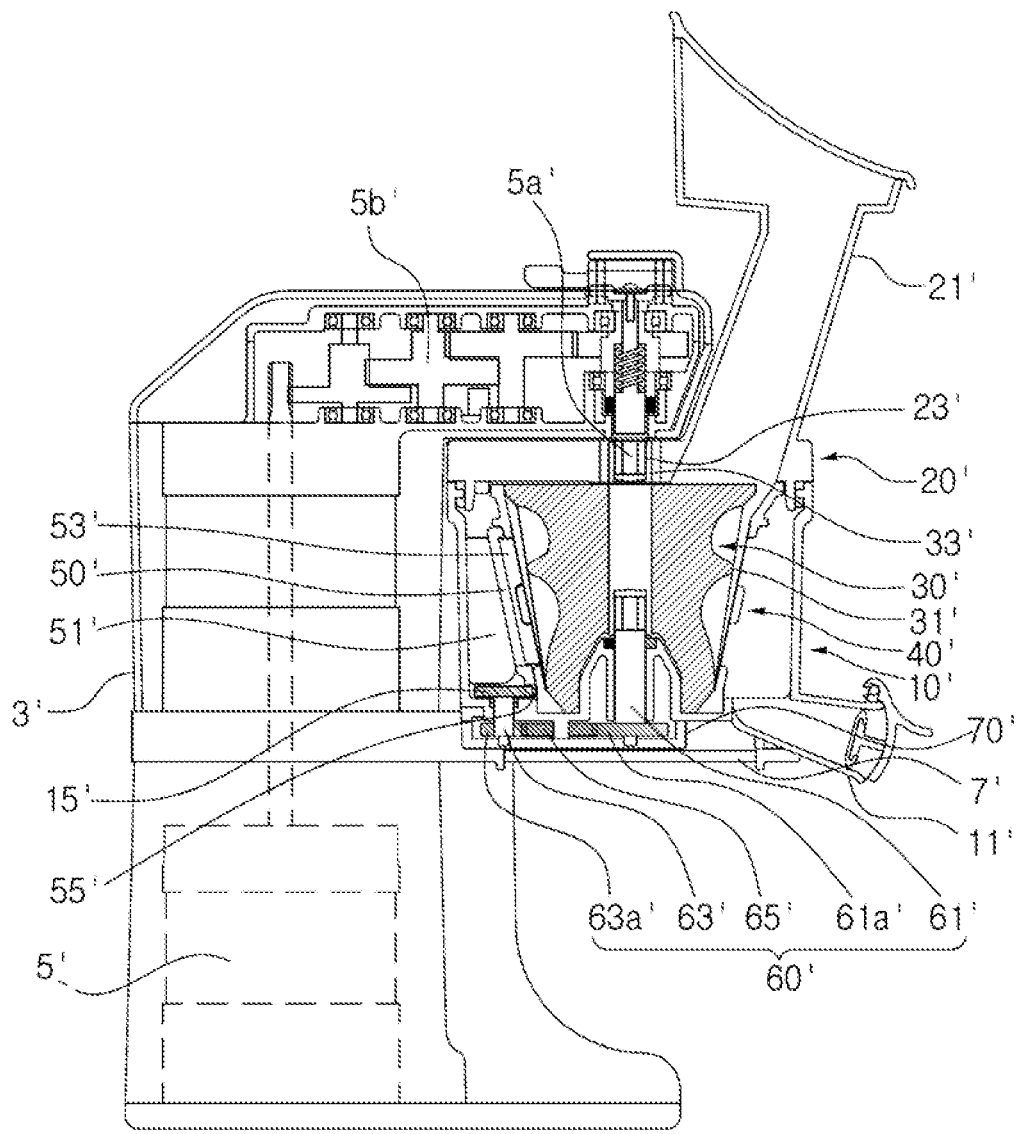
FIG. 8 is a sectional view showing a juice squeezing module for a juicer according to a third embodiment of the present invention.

As shown in FIG. 8, a juice squeezing module for a juicer according to a third embodiment of the present invention is mounted on a body 3' of the upper powered type juicer having a driving shaft 5a' protruding downward therefrom and serves to perform a juice squeezing operation.

In this case, the body 3' of the juicer has a general driving motor 5' mounted at the inside thereof to generate a rotary driving force of a juice squeezing screw 30' therefrom, and the driving shaft 5a' is spaced apart from the shaft protruding upward from the driving motor 5' in such a manner as to be connected to the driving motor 5' by means of a connection module 5b' disposed between the shaft of the driving motor 5' and the driving shaft 5a'.

The lower end periphery of the driving shaft 5a' protrudes downward from the body 3' in such a manner as to be passed through a cap 20' and coupled to the top end periphery of a juice squeezing screw 30', and further, the body 3' has a juice squeezing drum seating portion 7' formed thereon to detachably mount a juice squeezing drum 10' thereon.

The driving motor 5' is a part for providing the driving force by which the juice squeezing screw 30' rotates at a low speed and is connected to the driving shaft 5a' protruding downward by means of the connection module 5b'. The driving motor 5' can be freely selected in accordance with the shapes or use purposes of the juicer.

The juice squeezing drum seating portion 7' serves to supportedly mount the juice squeezing drum 10' on the body 3' of the juicer and is formed on the upper side of the body 3' to a shape corresponding to the underside of the juice squeezing drum 10'. Only if the juice squeezing drum seating part 7' stably supports the juice squeezing drum 10' in the state of being spaced apart from the ground by a given distance, it does not matter in shape.

The juice squeezing module for the juicer according to the third embodiment of the present invention, which is mounted on the body 3' of the juicer as mentioned above, includes the juice squeezing drum 10', the cap 20', the juice squeezing screw 30', a screen drum 40', a rotating brush 50', and brush rotating means 60'.

The juice squeezing drum 10' serves to accommodate the juice squeezing screw 30', the screen drum 40' and the rotating brush 50' thereinto and is open on the top surface thereof and mounted on the juice squeezing drum seating portion 7' of the body 3' of the juicer.

The juice squeezing drum 10' has a juice discharging hole 11' and a remnant discharging hole (which is not shown) formed spaced apart from each other on the lower end periphery thereof, and according to the present invention, the juice discharging hole 11' and the remnant discharging hole have a shape of a protruding pipe having an open front surface, through which juice or remnants can be easily discharged.

The juice squeezing drum 10' has an engagement gear 15' disposed on the bottom surface at the inside thereof, and the engagement gear 15' receives the rotary driving force of the driving shaft 5a' from the brush rotating means 60' and the juice squeezing screw 30' to rotate the rotating brush 50'.

The engagement gear 15' is disposed on the edge of the periphery of the bottom surface of the juice squeezing drum 10', not on the area of the bottom surface thereof wherein the juice squeezing screw 30' is mounted, so that the engagement gear 15' is brought into contact with the outer or inner periphery of a brush ring gear 55' of the rotating brush 50'. Such formation of the engagement gear 15' improves the space utilization and the freedom of design for the bottom surface of the juice squeezing drum 10', especially, for the bottom surface of the juice squeezing drum 10' located under the juice squeezing screw 30', thus making the lower portion of the juice squeezing drum 10' freely designed with no restriction.

The cap 20' is detachably coupled to the top surface of the juice squeezing drum 10' and has an underside shape corresponding to the top surface of the juice squeezing drum 10' so as to cover the open top surface of the juice squeezing drum 10'. The cap 20' is open on the underside thereof and has an injection hole 21' protruding upward from one side of the top surface thereof in such a manner as to be connected to the open underside surface thereof and open on the top surface thereof so as to allow extraction materials to be injected thereinto.

Further, the cap 20' has a driving shaft through hole 23' formed at the center thereof, into which the top end periphery of the driving shaft 5a' is rotatably passed and coupled to the juice squeezing screw 30' in the juice squeezing drum 10'.

The juice squeezing screw 30' is rotatably mounted at the inside of the juice squeezing drum 10' and serves to rotate in the screen drum 40' to compress, squeeze or grind the injected extraction materials between the juice squeezing screw 30' and the screen drum 40', thus producing the juice from the extraction materials. The juice squeezing screw 30' has a plurality of screw spiral lines 31' formed on the outer peripheral surface thereof so as to squeeze the injected extraction materials through the contact with the inner peripheral surface of the screen drum 40' and to compressedly move the squeezing materials toward the lower end side of the screen drum 40', and has a power connector 33' disposed on the top thereof in such a manner as to be connected to the driving shaft 5a' of the body 3' of the juicer.

The power connector 33' is disposed on the top of the juice squeezing drum 30' to transmit the driving force generated from the driving motor 5' to the juice squeezing screw 30'. The power connector 33' is desirably formed to a shape of a polygonal groove into which the driving shaft 5a is inserted, but only if the power connector 33' transmits the driving force generated from the driving motor 5' to the juice squeezing screw 30', it does not matter in shape.

The screen drum 40' is mounted at the inside of the juice squeezing drum 10' and has a screen structure (not shown) as the outer peripheral wall thereof to allow the juice extracted through the compression and squeezing or grinding between the juice squeezing screw 30' and the screen drum 40' from the extraction materials injected into the juice squeezing drum 20' through the injection hole 21', as the juice squeezing screw 30' rotates, to be discharged to the outside thereof. Further, the screen drum 40 is open on the top and underside thereof in such a manner as to become reduced in diameter as it goes toward the lower portion thereof.

The juice extracted through the cooperative operation between the juice squeezing screw 30' and the screen drum 40' through the rotation of the juice squeezing screw 30' is discharged through the screen structure of the screen drum 40', and the remnants of the extraction materials after the squeezing are discharged through the lower portion of the screen drum 40' to the remnant discharging hole.

The rotating brush 50' is disposed between the juice squeezing drum 10' and the screen drum 40' and serves to rotate between the juice squeezing drum 10' and the screen drum 40', while continuously brushing the inner peripheral surface of the juice squeezing drum 10' and the outer peripheral surface of the screen drum 40'.

The rotating brush 50' includes first brush members 51' disposed radially on the outer peripheral surface thereof to continuously brush the inner peripheral surface of the juice squeezing drum 10' and second brush members 53' disposed radially on the inner peripheral surface thereof to continuously brush the outer peripheral surface of the screen drum 40'. The first and second brush members 51' and 53' are desirably made of a soft silicone material not harmful to the human body so as to softly brush the inner peripheral surface of the juice squeezing drum 10' and the outer peripheral surface of the screen drum 40'.

The rotating brush 50' further has the brush ring gear 55' mounted on the underside periphery thereof, and the brush ring gear 55' is brought into contact with the engagement gear 15' to allow the rotating brush 50' to rotate according to the rotation of the engagement gear 15'.

The brush rotating means 60' is disposed on the underside of the juice squeezing drum 10' and serves to transmit the driving force of the driving shaft 5a' of the body 3' of the juicer to the engagement gear 15', thus finally rotating the rotating brush 50'.

The brush rotating means 60' is desirably formed of a gear module connecting the juice squeezing screw 30' and the engagement gear 15' of the juice squeezing drum 10', but may be replaced with various means connecting the lower end periphery of the shaft of the juice squeezing screw 30' and the engagement gear 15' of the juice squeezing drum 10'.

If the brush rotating means 60' is formed of the gear module connecting the lower end periphery of the shaft of the juice squeezing screw 30' and the engagement gear 15' of the juice squeezing drum 10', the brush rotating means 60' includes a first shaft gear 61' coupled to the lower end periphery of the shaft of the juice squeezing screw 30' in such a manner as to rotate unitarily with the juice squeezing screw 30' and having a first gear 61a' formed on the outer peripheral surface thereof and a second shaft gear 63' coupled to the center shaft of the engagement gear 15' on the top end periphery thereof and having a second gear 63a' formed on the outer peripheral surface of the lower portion thereof in such a manner as to be connected to the first gear 61a'.

In this case, desirably, the brush rotating means 60' further includes a gear 65' interposed between the first gear 61a' of the first shaft gear 61' and the second gear 63a' of the second shaft gear 63'.

Further, a brush rotating means cover 70' is coupled to the underside of the juice squeezing drum 10' on which the brush rotating means 60' is disposed. The brush rotating means cover 70' serves to support and cover the lower portion of the brush rotating means 60' and has a shape of a casing open on the top end thereof in such a manner as to be sealedly coupled to the underside of the juice squeezing drum 10' by means of fastening members (not shown). However, only if the brush rotating means cover supports the brush rotating means disposed on the underside of the juice squeezing drum 10', it does not matter in shape.

In case of the juice squeezing module for the juicer according to the third embodiment of the present invention, the engagement gear 15' for the engagement rotation with the rotating brush 50' is disposed on the edge of the periphery of the bottom surface of the juice squeezing drum 10', not on the area of the bottom surface thereof wherein the juice squeezing screw 30' is mounted, and at the same time, the brush rotating means 60', which transmits the rotary driving force of the juice squeezing screw 30' according to the driving shaft 5a' of the body 3' to the engagement gear 15' to engagedly rotate the rotating brush 50', is disposed on the underside of the juice squeezing drum 10', so that the introduction of remnants into the juice can be prevented and the freedom of design for the bottom surface of the juice squeezing drum 10' can be improved, thus making the lower portion of the juice squeezing drum 10' designed freely and allowing the remnants to be gently and uniformly discharged to achieve effective juice squeezing operation.

As described above, the juice squeezing module for the juicer according to the present invention is configured wherein the engagement gear for the engagement rotation with the rotating brush is disposed on the edge of the periphery of the bottom surface of the juice squeezing drum, not on the area of the bottom surface thereof wherein the juice squeezing screw is mounted. Further, the brush rotating means, which transmits the driving force of the driving shaft of the body to the engagement gear to engagedly rotate the rotating brush, is disposed on the underside of the juice squeezing drum, so that the introduction of remnants into the juice can be prevented. Furthermore, the freedom of design for the bottom surface of the juice squeezing drum can be improved, thus making the lower portion of the juice squeezing drum designed freely and allowing the juice squeezing drum to be easily coupled to the body, without having any complication on the upper structure of the body. Additionally, the remnants can be gently and uniformly discharged to achieve effective juice squeezing operation.

The juice squeezing module for the juicer according to the present invention can be applied to the typical lower powered and upper powered type juicers, so that it can be applied to all kinds of juicers having the rotating brush, irrespective of its driven type.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A juice squeezing module for a juicer adapted to be mounted on a body of the juicer with a driving shaft protruding upward therefrom to perform a juice squeezing operation, the juice squeezing module comprising:
   a juice squeezing drum mounted on the body of the juicer in such a manner as to be open on the top surface thereof and having a juice discharging hole and a remnant discharging hole formed on the lower end periphery thereof and an engagement gear disposed on an inner bottom surface thereof;
   a cap adapted to cover the top surface of the juice squeezing drum and having an injection hole formed on the top side thereof;
   a juice squeezing screw rotatably mounted at the inside of the juice squeezing drum and having screw spiral lines formed on the outer peripheral surface thereof and a power connector disposed on the underside thereof in such a manner as to be connected to the driving shaft;
   a screen drum mounted at the inside of the juice squeezing drum and having a screen structure as the outer peripheral wall thereof;
   a rotating brush disposed between the juice squeezing drum and the screen drum in such a manner as to rotate and brush the inner peripheral surface of the juice squeezing drum and the outer peripheral surface of the screen drum and having a brush ring gear mounted on the underside periphery thereof in such a manner as to be connected to the engagement gear;
   brush rotating means disposed on the underside of the juice squeezing drum to transmit the driving force of the driving shaft of the body of the juicer to the engagement gear to rotate the rotating brush; and
   a brush rotating means cover coupled to the underside of the juice squeezing drum to support the lower portion of the brush rotating means,
   wherein the brush rotating means is disposed between the underside of the juice squeezing drum and the brush rotating means cover coupled to the underside of the juice squeezing drum.

2. The juice squeezing module for a juicer according to claim 1, wherein the brush rotating means is formed of a gear module connecting the driving shaft and the engagement gear.

3. The juice squeezing module for a juicer according to claim 2, wherein the gear module comprises
   a first shaft gear having a first gear formed on the outer peripheral surface thereof, and a second shaft gear having a top end periphery coupled to a center shaft of the engagement gear and a second gear formed on the outer peripheral surface of the lower portion thereof,
   wherein the driving shaft, the power connector of the juice squeezing screw and the first shaft gear are connected to each other in such a manner as to rotate unitarily with each other, and
   wherein the driving force of the driving shaft is transmitted to the engagement gear through the first shaft gear and the second shaft gear.

4. The juice squeezing module for a juicer according to claim 3, wherein the gear module further comprises a gear interposed between the first gear of the first shaft gear and the second gear of the second shaft gear.

5. The juice squeezing module for a juicer according to claim 3, wherein a top end of the first shaft gear is coupled to the power connector and a bottom end of the first shaft gear is coupled to the driving shaft.

6. A juice squeezing module for a juicer adapted to be mounted on a body of the juicer with a driving shaft protruding downward therefrom to perform a juice squeezing operation, the juice squeezing module comprising:
   a juice squeezing drum mounted on the body of the juicer in such a manner as to be open on the top surface thereof and having a juice discharging hole and a remnant discharging hole formed on the lower end periphery thereof and an engagement gear disposed on the edge of the periphery of the bottom surface thereof;
   a cap adapted to cover the top surface of the juice squeezing drum and having an injection hole formed on the top side thereof and a driving shaft through hole formed at the center thereof, through which the top end periphery of the driving shaft is rotatably passed;
   a juice squeezing screw rotatably mounted at the inside of the juice squeezing drum and having screw spiral lines formed on the outer peripheral surface thereof and a power connector disposed on the top thereof in such a manner as to be connected to the driving shaft;
   a screen drum mounted at the inside of the juice squeezing drum and having a screen structure as the outer peripheral wall thereof;
   a rotating brush disposed between the juice squeezing drum and the screen drum in such a manner as to rotate and brush the inner peripheral surface of the juice squeezing drum and the outer peripheral surface of the screen drum and having a brush ring gear mounted on the underside periphery thereof in such a manner as to be connected to the engagement gear; and
   brush rotating means disposed on the underside of the juice squeezing drum to transmit the rotary driving force of the juice squeezing drum to the engagement gear to rotate the rotating brush,
   wherein the brush rotating means is formed of a gear module connecting the juice squeezing screw and the engagement gear.

7. The juice squeezing module for a juicer according to claim 6, wherein the gear module comprises:
   a first shaft gear coupled to the lower end periphery of the shaft of the juice squeezing screw in such a manner as to rotate unitarily with the juice squeezing screw and having a first gear formed on the outer peripheral surface thereof; and
   a second shaft gear coupled to the center shaft of the engagement gear on the top end periphery thereof and having a second gear formed on the outer peripheral surface of the lower portion thereof in such a manner as to be connected to the first gear.

8. The juice squeezing module for a juicer according to claim 7, wherein the gear module further comprises a gear interposed between the first gear of the first shaft gear and the second gear of the second shaft gear.

9. The juice squeezing module for a juicer according to claim 6, further comprising a brush rotating means cover coupled to the underside of the juice squeezing drum to cover and support the lower portion of the brush rotating means.

10. The juice squeezing module for a juicer according to claim 3, wherein the power connector penetrates through and is coupled to the first shaft gear.

11. The juice squeezing module for a juicer according to claim 10, wherein the driving shaft is coupled to the power connector penetrating through the first shaft gear.

12. The juice squeezing module for a juicer according to claim 3, wherein the driving shaft penetrates through the first shaft gear and is coupled to the power connector.

13. The juice squeezing module for a juicer according to claim 3, wherein the driving shaft is coupled to a bottom end of the first shaft gear, and a top end of the first shaft gear is coupled to the power connector.

* * * * *